FIELD EFFECT TRANSISTOR DRIVER USING CAPACITOR FEEDBACK

Original Filed Dec. 14, 1966 2 Sheets-Sheet 1

INVENTORS
ROBERT W. POLKINGHORN
ARTHUR F. PFEIFER
BY WILLIAM H. DIERKING
Robert D. Rogers
ATTORNEY

FIELD EFFECT TRANSISTOR DRIVER USING CAPACITOR FEEDBACK

Original Filed Dec. 14, 1966 2 Sheets-Sheet 2

INVENTORS
ROBERT W. POLKINGHORN
ARTHUR F. PFEIFER
BY WILLIAM H. DIERKING
Robert G. Rogers
ATTORNEY United States Patent Office Re. 27,305
Reissued Mar. 14, 1972

27,305

FIELD EFFECT TRANSISTOR DRIVER USING CAPACITOR FEEDBACK

Robert W. Polkinghorn, Huntington Beach, Arthur F. Pfeifer, Whittier, and William H. Dierking, Orange, Calif., assignors to North American Rockwell Corporation Original No. 3,506,851, dated Apr. 14, 1970, Ser. No. 601,774, Dec. 14, 1966. Application for reissue May 25, 1970, Ser. No. 40,142
Int. Cl. H03k *17/00*
U.S. Cl. 307—251 5 Claims

Matter enclosed in heavy brackets [ ] appears in the original patent but forms no part of this reissue specification; matter printed in italics indicates the additions made by reissue.

ABSTRACT OF THE DISCLOSURE

This invention relates to a driver for MOS devices comprising a capacitor, including means for charging and preventing discharge of the capacitor, connected between the gate electrode of the output transitor and the output for feeding back the output voltage to the gate electrode, whereby relatively higher voltage and current output from the driver is achieved without increasing the supply voltage.

BACKGROUND OF THE INVENTION

Field of the invention

The invention pertains to a metal oxide semiconductor (MOS) transistor driver for use with other MOS devices such as gating devices.

Description of the prior art

Present art MOS gating devices ordinarily may not provide enough current to drive succeeding stages. It is necessary to insert a driver between the gating device and the succeeding stages to increase the voltage and current available to the succeeding stages. However, and inasmuch as, the driver devices produced with existing techniques occupy a portion of the substrate structure adjacent to the gating devices, the driver should be as small in size as possible and should have as low a power dissipation as possible so as not to impair the operation of the other devices.

Many driver dissipate excessive power and are not as efficient as desired because of the threshold voltage drop between the supply voltage and the output of an MOS transistor. In other words, the output voltage from a driver is ordinarily less negative than the supply voltage by one threshold voltage value for each stage of the driver. Since most drivers use at least two stages, the output from the last stage may be two thresholds lower than the supply voltage. Therefore, for a given or required output voltage, the supply voltage must be increased to compensate for the voltage drop. The increased voltage causes an increase in power dissipation from the driver. One example of a threshold voltage drop is five volts. An increase of the supply voltage may also necessitate a re-design of other circuits unless two supply voltages are used.

SUMMARY OF THE INVENTION

Briefly, the present invention provides a driver for use with MOS gating devices in which the output voltage from the driver is "fed back," or supplied, to the gate electrode of the output transistor by means of a capacitor coupled between the gate electrode and the output electrode. The capacitor is initially charged during a first interval of time to the level of the output voltage of a first stage as a function of the state of an input signal to the driver. Under conditions where the input signal is true, the capacitor is charged through a relatively low resistance path. When the input becomes false, the capacitor retains its charge because a relatively high resistance path replaces the relatively low resistance. The gate voltage of the output transistor increases through the capacitor but the voltage differential between the gate and the output electrode remains fixed. The feedback voltage holds the output transistor on and sets the output to the value of the supply voltage.

In certain applications, where more current is required, an additional driver stage may be added. In such cases, the output voltage may be one threshold lower than the supply voltage.

In other embodiments, an additional capacitor or a RC network may be added to delay the change in output voltage while the feedback capacitor is being charged.

The capacitor which serves as a feedback capacitor can be formed at the same time as the MOS devices are formed. In other words, when the gate electrode for the device is formed, the metal portion forming the gate is increased in dimensions to serve as one side of a capacitive plate. A portion of the source electrode of the MOS transistor is similarly increased in dimension to comprise the other plate of the capacitor. As a result, the one capacitive plate is integrally formed with the gate electrode and the other plate is integrally formed with the source electrode.

Therefore, it is an object of this invention to provide an MOS driver having a relatively increased voltage and current producing capability.

It is a further object of this invention to provide an improved MOS driver using capacitive feedback.

It is another object of this invention to provide an MOS transistor usable with an MOS driver using capacitive feedback wherein the capacitive element is produced at the same time as the MOS transistor comprising part of the driver is produced.

These and other objects of this invention will become more apparent in connection with the following drawings of which,

DESCRIPTION OF THE PREFERRED EMBODIMENTS

Figure 1:
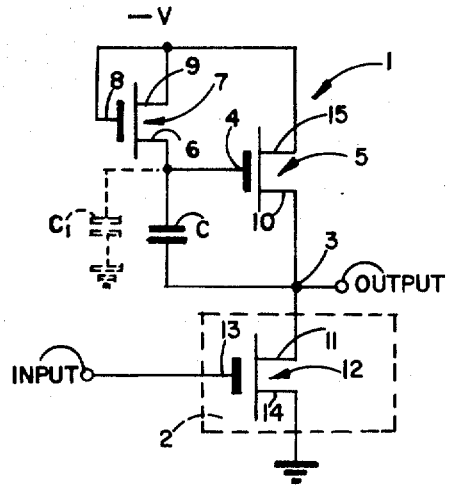
FIGURE 1 shows a preferred embodiment of the MOS driver using a capacitive feedback.

Referring now to FIGURE 1, wherein is illustrated MOS driver 1, comprising capacitor C, connected between output 3 and gate electrode 4 of MOS transistor 5. Capacitor C is also connected to source electrode 6 of MOS transistor 7. Gate electrode 8 and drain electrode 9 of transistor 7 are connected to supply voltage —V. Source electrode 10 of transistor 5 is connected to output 3 and drain electrode 11 of transistor 12. Input logic 2 s comprised of transistor 12. The gate electrode 13 of ransistor 12 is designated as the input. Source electrode 14 is connected to a ground level. Drain electrode 15 of ransistor 5 is connected to supply voltage —V.

Input transistor 12 is made relatively larger in size with respect to transistors 5 and 7 so that the output will approximate the ground level appearing on the source electrode when the input transistor is turned on by a negative signal applied to its gate electrode.

Although a single transistor is shown for the input logic, t should be obvious that several devices in various configurations, may be used as the input logic. Also, source electrode 14 need not be connected to ground but could be connected to a single source. A single device is shown for simplifying the description of the preferred embodiment. It should also be noted that the device can be produced n an embodiment which does not use input logic but only requires the use of a transistor or similar switching device for controlling the voltage appearing at the output.

Figure 6:
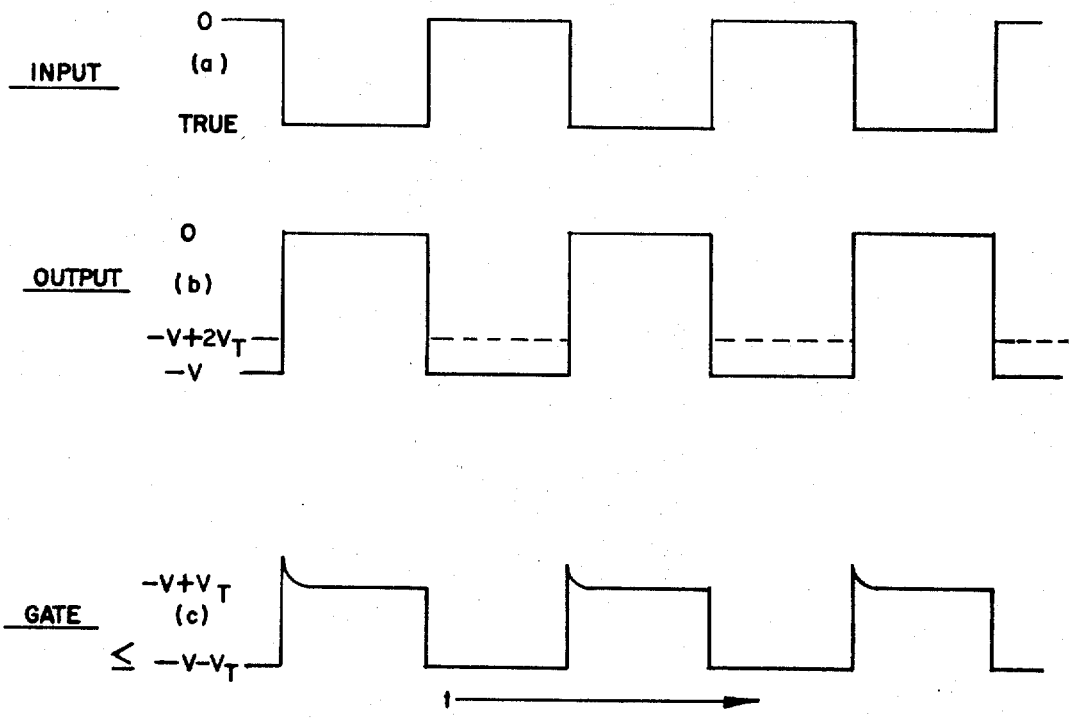
FIGURE 6 shows a representation of waveforms for the FIGURE 1 embodiment.

In operation, as shown by the curves in FIGURE 6, when the input transistor is turned on, the output is approximately ground, or zero, volts (curves a and b). Transistor 7 is held on because its gate is connected to —V and therefore, is at least one threshold more negative than its source electrode.

During the interval of time that transistor 12 is on, capacitor C is charged to the voltage level of the supply, —V, plus the threshold voltage, $V_t$, of transistor 7. In effect, the capacitor is charged to the difference between the voltage at the output and the voltage at the gate. Since the output voltage is approximately zero, the capacitor is charged to the level indicated above. The voltage level of the capacitor and the gate electrode of transistor 5, while the capacitor is being charged, is shown in curve c. When the capacitor is fully charged transistor 7 is turned off to place a high resistive path between the capacitor and the supply. Although the resistance is relatively high, some leakage does occur. The leakage through the high resistance accounts for the peaks shown in curve c.

When the input goes false, or zero, for the logical order adopted the output goes negative. The output voltage is fed back to the gate electrode (curve c). As a result, the gate becomes more negative than the output by at least two thresholds in value. The transistor continues to turn on until the output is set at —V as indicated by curve b.

If the capacitor had not been used the output could go no more negative than —V plus the two threshold voltages of transistor 5 and 7. In other words, since the gate electrode must always be more negative in value by at least one threshold than the source electrode, and since the voltage at the source of transistor 7 (and gate electrode 4) is one threshold less than —V, the voltage at the source of transistor 5 would be one threshold less than the voltage appearing at its gate electrode. Therefore, the output voltage would be two thresholds less negative than the supply voltage without capacitor C.

Inasmuch as the driver has inherent electrode capacitances and stray capacitances designated as $C_1$, capacitor C must be selected so that the charge distribution on the capacitors will provide the desired voltage increase at the gate of transistor 5. $C_1$ is also intended to include other stray capacitances of the device. The selection can be made empirically or calculated mathematically if the other circuit values are known.

For example, if $C_1$ is much smaller than C, the effective capacitor will have little effect on the operation of the circuit. However, if $C_1$ is not small with respect to C, the charge will be distributed between the two capacitances and the effective voltage appearing at the gate may be reduced. For example, if the capacitances are equal, the charge would be equally distirbuted between capacitor C and effective capacitor $C_1$. For the FIGURE 1 embodiment, the effective gate voltage increase should be at least equivalent to two threshold voltages. In other words, the difference between the output and the gate should be equal to or greater than two threshold voltages in order to completely turn transistor 12 on.

It should be pointed out that although transistor 7 is shown between the supply voltage and capacitor C it could be replaced by other devices [such as a relatively large resistor or diode, etc.,] that would hold the charge on the capacitor while the output is going negative.

Figure 2:
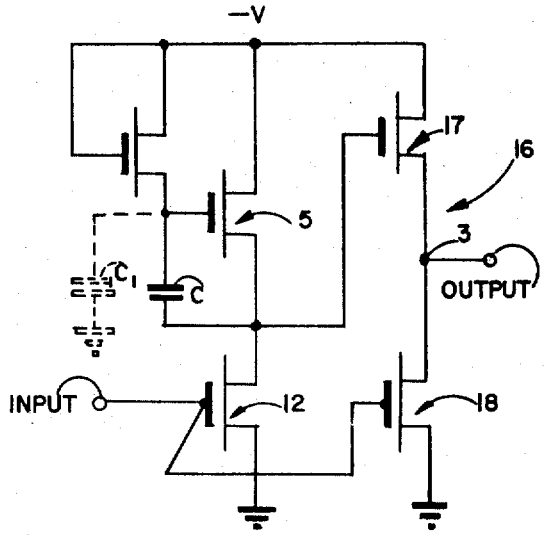
FIGURE 2 shows a preferred embodiment of the FIGURE 1 device using a push-pull output stage.

Transistor 5 may be described as a switched resistor which has a high resistance when transistor 12 is on and a relatively lower resistance when transistor 12 is turned off. In other words, the resistance of the device decreases as the voltage at the gate increases. Because of the lower resistance, the transistor can be switched faster from off to on and can be used directly as an output driver without the addition of a push-pull stage as shown in FIGURE 2. The transistor can also be made smaller than normal, that is, a higher $g_m$ transistor can be used without encountering normal voltage divider problems between transistor 5 and transistor 7. So long as the gate to source electrode voltage remains constant, the transistor functions as a constant current source.

Referring now to FIGURE 2, wherein is added push-pull stage 16, comprising transistors 17 and 18. Transistors 18 and 12 are turned on in the presence of a negative signal at the input. Transistor 17 is turned on when output 3 goes negative. Transistor 17 is made relatively large in size so that it can provide more current than could transistor 5. In other respects, the circuit is identical to the circuit shown in FIGURE 1.

Figure 3:
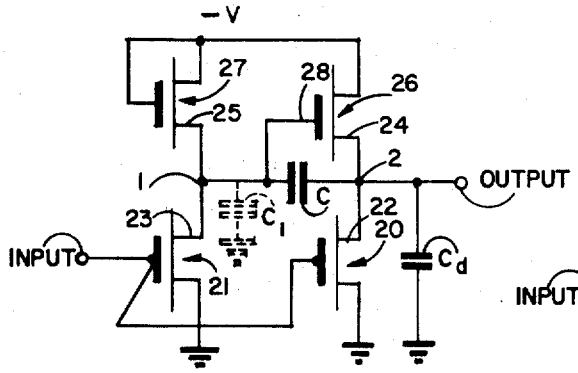
FIGURE 3 shows a second embodiment of the MOS driver using a push-pull output stage.

Referring now to FIGURE 3, wherein is shown a second embodiment of a driver using capacitance feedback. The driver comprises MOS transistors 20 and 21 each having their respective gate electrodes connected to an input. Capacitor C is connected between drain electrode 22 of transistor 20 and drain electrode 23 of transistor 21. It is also connected between source electrode 24 of transistor 26 and source electrode 25 of transistor 27. The output is connected to source electrode 24 and drain electrode 22 of transistor 20 and 26. Delay capacitor $C_d$ is connected between the output and ground. Effective capacitor $C_1$ is represented by the dotted connection to ground.

Gate electrode 28 of transistor 26 is connected to one side of the capacitor C and also to the source electrode of transistor 27.

The gate electrode of transistor 27 is connected to supply voltage —V so that the transistor is held on.

In operation, when the input is true, transistors 20 and 21 are turned on and both sides of the capacitor C are connected to ground. Transistor 20 and 21 are physically larger than transistor 27. When the input becomes false, transistors 20 and 21 are cut off and the source electrode of transistor 27 goes negative by the amount of the supply voltage pluse the threshold voltage of the transistor.

Delay capacitor $C_d$ prevents the output from going negative for a period of time sufficient to permit capacitor C to charge to the value appearing at the source electrode of transistor 27. The output becomes negative after capacitor $C_d$ is charged and as described in connection with FIGURE 1, the output is set at —V.

Electrode capacitance $C_1$ must be taken into account in selecting a value for capacitor C as was previously described for the FIGURE 1 embodiment.

Figure 4:
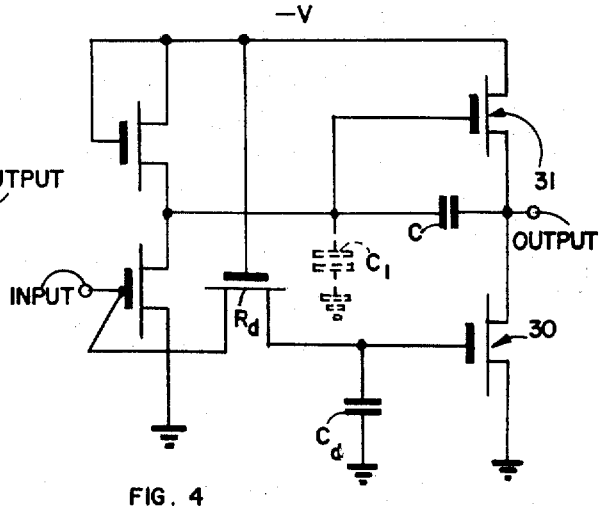
FIGURE 4 shows a third embodiment of the MOS driver using a push-pull output stage.

Operation of the FIGURE 4 embodiment is approximately the same as the operation described in connection with the previous embodiments. The output of the device is delayed from going negative by means of delay capacitor $C_d$ and delay transistor $R_d$. Transistor $R_d$ is used as a time constant resistor. $R_d$ is held on because its gate electrode is connected to —V. When the input is true, $C_d$ charges to the true value of the input signal, which for the embodiment shown, is a negative voltage. When the input is false, $C_d$ discharges to ground through $R_d$. Transistor 30 remains on for a period of time sufficient to permit capacitor C to charge to the value appearing at the source electrode of transistor 31. Subsequently, the output begins to go negative until it is equal to —V.

Figure 5:
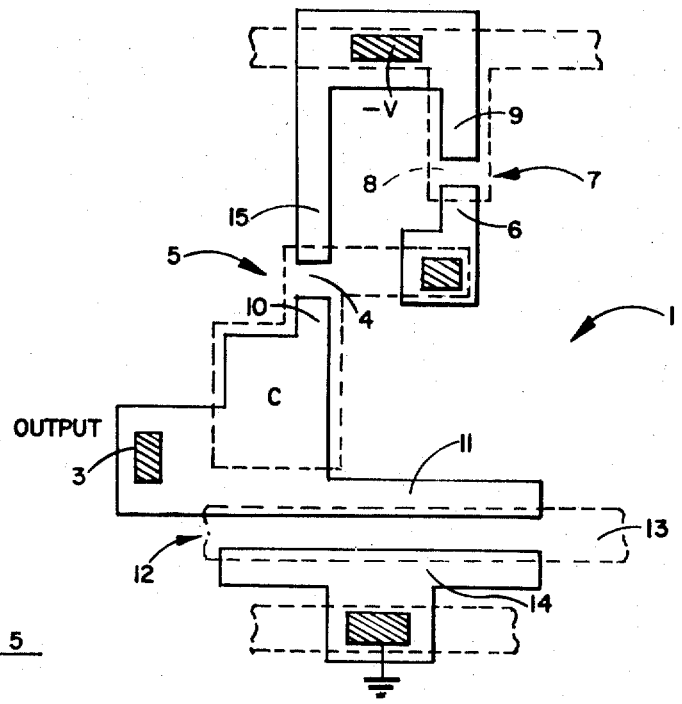
FIGURE 5 shows a layout of the FIGURE 1 embodiment on a substrate, including a representation of capacitor C.

Referring now to FIGURE 5, wherein is shown a representation of the FIGURE 1 embodiment produced on a silicon substrate, or chip. The other embodiments can be similarly produced. Although only one driver is shown, it should be obvious that several such devices could be produced simultaneously in a substrate. Also, a plurality of drivers and gating devices could be produced on the same substrate.

In the process, well known to those skilled in the art, an oxide film is formed over a substrate such as n type silicon. A p type substrate could also be used with the result that the devices formed would be n type instead of p type. Subsequently, holes are formed through the outside layers and impurities are diffused into the silicon to form p type silicon. During the diffusion, an oxide layer forms over the diffused regions.

Following the diffusion, the oxide layer where gate electrodes are to be formed, is thinned so that the gate voltage has greater effect on the conductance between electrodes of the MOS transistor formed.

After the thinning step is finished, holes are again formed through the outside layer and metal layers are disposed directly onto the diffused regions and over other areas of the substrate to form electrodes and contacts.

As shown in FIGURE 5, one diffusion was required to form the p type regions for transistors 5, 7 and 12. The metal elements forming the input and gate 13 for transistor 12 are insulated from the n region and the p region (11 and 14) by a thin oxide layer (not apparent in the figure). When a negative signal appears on the input, the n type region separating electrodes 11 and 14, in effect, becomes p type silicon and conduction occurs between the electrodes. Since source electrode 14 is connected to the ground when the input is "true," the output 3 has a near ground or zero volt level. The output electrode is also part of source electrode 10 of transistor 5.

Drain electrode 15 is connected to supply voltage —V. Transistor 7 comprising electrodes 9 and 6, was formed at the same time as the other transistor elements were formed. Gate electrode 8, shown connected to the supply voltage, is formed over the p type regions comprising electrodes 6 and 9 of transistor 7. Source electrode 6 is connected to gate electrode 4 of transistor 5.

Instead of separately forming capacitor C, and providing metal contacts to interconnect the capacitor with the driver, the capacitor may be formed as shown in FIGURE 5 by enlarging the metal element comprising gate electrode 4 to form one plate of the feedback capacitor. The other plate is comprised of p type material over which the capacitor plate is disposed.

The p type region comprising the other plate of the capacitor was enlarged in area to accommodate the metal plate. As a result of forming the capacitor in the manner described, one plate of the capacitor is integral with gate 4 and the other plate of the capacitor is integral with output 3 and drain electrode 11 of transistor 12.

Although a specific capacitor configuration is shown, it should be obvious that various capacitor sizes and configurations can be formed depending on the particular requirements of a circuit embodiment.

Although the invention has been described and illustrated in detail, it is to be understood that the same is by way of illustration and example only, and is not to be taken by way of limitation; the spirit and scope of this invention being limited only by the terms of the appended claims.

We claim:

[1. A MOS transistor driver having a voltage and current output, comprising, capacitor means, a voltage and current source, first MOS transistor means having an output electrode a second electrode connected to said source, and a gate electrode, said capacitor means being connected between said output electrode and said gate electrode for feeding back the output electrode voltage to the gate electrode after said capacitor is charged for turning said transistor on to set the output electrode to the voltage of said source, first switch means connected between said source and gate electrode for inserting a relatively low resistance between said source and gate electrode while said capacitor is being charged, and for inserting a relatively high resistance between said source and said gate after said capacitor has been charged.]

[2. The combination as recited in claim 1, wherein said first switch means comprises a second MOS transistor means having a gate electrode and a first electrode connected to said source and a second electrode connected to the gate electrode of the first MOS transistor means.]

[3. The combination as recited in claim 1, including an input having a voltage level, and second switch means including means responsive to said input for connecting said output electrode to a second voltage level while said capacitor is charging, and for disconnecting said output from said second voltage level after the capacitor has been charged.]

[4. The combination as recited in claim 3, wherein said first switch means comprises a second MOS transistor means having a gate electrode and a first electrode connected to said source and a second electrode connected to the gate electrode of said first MOS transistor means, and said second switch means comprises a third MOS transistor means having gate electrode connected to said input, a first electrode connected to said second voltage level, and a second electrode connected to said output.]

5. *A MOS transistor driver having a voltage and current output, comprising,*

*capacitor means,*

*a voltage source,*

*first MOS transistor means having an output electrode, a second electrode connected to said source, and a gate electrode,*

*said capacitor means being connected between said output electrode and said gate electrode for feeding back the output electrode voltage to the gate electrode after said capacitor is charged for turning said transistor on to set the output electrode to the voltage of said source,*

*first switch means connected between said source and gate electrode for inserting a relatively low resistance between said source and gate electrode while said capacitor is being charged, and for inserting a relatively high resistance between said source and said gate after said capacitor has been charged and further* [5. The combination as recited in claim 1,] including an input having a voltage level, and second switch means including means responsive to said input for connecting said output electrode to a second voltage level while said capacitor is charging, and for disconnecting said output from said second voltage level after the capacitor has been charged, including a delay capacitor connected between said output electrode and said second voltage level for delaying disconnecting the output electrode from said second voltage level until said delay capacitor has been charged, said delay being sufficient to enable said capacitor means to charge to said first voltage level[s], and third switch means responsive to the input for connecting said gate electrode to said second voltage level while said output is connected to said second level, and for disconnecting said gate from said second voltage level prior to the charging of said delay capacitor.

6. *A MOS transistor driver having a voltage and current output, comprising,*

*capacitor means,*

*a voltage source,*

*first MOS transistor means having an output electrode, a second electrode connected to said source, and a gate electrode,*

*said capacitor means being connected between said output electrode and said gate electrode for feeding back the output electrode voltage to the gate electrode after said capacitor is charged for turning said transistor on to set the output electrode to the voltage of said source,*

*first switch means connected between said source and gate electrode for inserting a relatively low resistance between said source and gate electrode while said capacitor is being charged, and for inserting a relatively high resistance between said source and said gate after said capacitor has been charged and further* [6. The combination as recited in claim 1,] including an input having a voltage level, and second switch means including means responsive to said input for connecting said output electrode to a second voltage level while said capacitor is charging, and for disconnecting said output from said second voltage level after the capacitor has been charged, including a delay capacitor connected between the input and the second voltage level to the second switch means, and a delay resistor means connected between said input and the delay capacitor for delaying said second switch means for disconnecting the output from said second voltage level while said delay capacitor is charging to the voltage level of said input through said delay resistor.

7. The combination as recited in claim 6, wherein said delay resistor means comprises a MOS transistor having a gate electrode connected to said source, a first electrode connected to said input, and a second electrode connected to the capacitor and the second switch means.

[8. In combination, first MOS transistor means having a first electrode, an output electrode and a gate electrode, source means connected to said first electrode for supplying voltage and current to said output electrode when said transistor is turned on, capacitor means, means connected to both sides of said capacitor means for charging said capacitor to a voltage level during a first interval of time, including switch means for preventing discharge of said capacitor after it is charged, said capacitor being connected between the output said said gate, said capacitor voltage charge plus the output voltage turning the first transistor on for setting the output to the vlotage of said source means.]

[9. A field effect transistor amplifier having an output and comprising, a first field effect transistor having a first electrode connected to said output, second electrode connected to a first voltage level and a control electrode, a capacitor connected between said first electrode and said control electrode, a first switch means connected between said first voltage level and said control electrode for charging said capacitor and for providing a relatively high impedance between said first voltage level and said control electrode after said capacitor is charged.

a second switch means for connecting said first electrode to a second voltage level for charging said capacitor to the voltage difference between said first and second voltage levels and for disconnecting said first electrode from said second voltage level after said capacitor is charged.

said first field effect transistor being responsive to the voltage difference on said capacitor for driving said first electrode and the output towards said first voltage level, said voltage difference on said control electrode being increased by voltage fed back through said capacitor from said first electrode for enhancing the first field effect transistor until the voltage on said first electrode and the output is equal to said first voltage level.]

[10. The combination recited in claim 1 further including a delay capacitor connected between said second electrode and said second voltage level, said delay capacitor being charged to the difference between said first and second voltage levels during the period said first field effect transistor is operable, a third switch means for connecting the control electrode of said first field effect transistor to said second voltage level during a first phase of an input signal, said third switch means disconnecting said control electrode from said second voltage level during a second phase of the input signal for enabling said first recited capacitor to charge to said voltage difference, said second switch means comprising, a field effect transistor for connecting said second electrode to said second voltage level during the first phase of the input signal, said field effect transistor being responsive to the charge on said delay capacitor during the second phase of the input signal for delaying disconnecting said second electrode from said second voltage level after the first recited capacitor is charged to the voltage difference.]

[11. The combination recited in claim 1 including a second field effect transistor for connecting the control electrode of the first field effect transistor to said second voltage level during a first phase of an input signal, said second switch means comprising, a third field effect transistor connected between said first electrode and said second voltage level and having a control electrode, a delay capacitor connected between said control electrode and said second voltage level, a delay field effect transistor having a control electrode connected to said first voltage level and a first electrode connected to the control electrode of said third field effect transistor and to said delay capacitor, and said delay field effect transistor further having a second electrode for receiving said input signal, said delay field effect transistor being operable during a first phase of said input signal for rendering said third field effect transistor becoming operable, said delay capacitor charging to the difference between said input signal and said second voltage level during said first phase, said delay field effect transistor providing a discharge pattern for said delay capacitor during said second phase, said third field effect transistor being held in an operable condition for a period of time determined by the RC time constant of said field effect transistor and said delay capacitor, said period of time being sufficient to enable said first recited capacitor to charge to the difference voltage.]

12. *A field effect transistor amplifier having an output and comprising*

*a first field effect transistor having a first electrode connected to said output, second electrode connected to a first voltage level and a control electrode,*

*a capacitor connected between said first electrode and said control electrode,*

*a first switch means connected between said first voltage level and said control electrode for charging said capacitor and for providing a relatively high impedance between said first voltage level and said control electrode after said capacitor is charged,*

*a second switch means for connecting said first electrode to a second voltage level during a first phase of an*

*input signal for enabling said capacitor to be charged to the difference between said first voltage level and said second voltage level and for disconnecting said first electrode from said second voltage level after said capacitor is charged,*

*said first field effect transistor being responsive to the voltage difference on said capacitor for driving said first electrode and the output towards said first voltage level,*

*said voltage difference on said control electrode being increased by voltage fed back through said capacitor from said first electrode for enhancing the conduction of the first field effect transistor until the voltage on said first electrode and the output is equal to said first voltage level,*

*a delay capacitor connected between said first electrode and said second voltage level, said delay capacitor being charged to the difference between said first and second voltage levels during the period said first field effect transistor is operable,*

*a third switch means for connecting the control electrode of said first field effect transistor to said second voltage level during a first phase of an input signal, said third switch means disconnecting said control electrode from said second voltage level during a second phase of the input signal for enabling said first recited capacitor to charge to said voltage difference.*

*said delay capacitor having a charge time for delaying disconnecting said first electrode from said second voltage level until the first recited capacitor is charged to the voltage difference.*

*13. A field effect transistor amplifier having an output and comprising,*

*a first field effect transistor having a first electrode connected to said output, second electrode connected to first voltage level and a control electrode,*

*a capacitor connected between said first electrode and said control electrode,*

*a first switch means connected between said first voltage level and said control electrode for charging said capacitor and for providing a relatively high impedance between said first voltage level and said control electrode for charging said capacitor and for providing a relatively high impedance between said first voltage level and said control electrode after said capacitor is charged,*

*a second switch means for connecting said first electrode to a second voltage level for charging said capacitor to the voltage difference between said first and second voltage levels and for disconnecting said first electrode from said second voltage level after asid capacitor is charged,*

*said first field effect transistor being responsive to the voltage difference on said capacitor for driving said first electrode and the output towards said first voltage level.*

*said voltage difference on said control electrode being increased by voltage fed back through said capacitor from said first electrode for enhancing the conduction of the first field effect transistor until the voltage on said first electrode and the output is equal to said first voltage level,*

*a second field effect transistor for connecting the control electrode of the first field effect transistor to said second voltage level during a first phase of an imput signal,*

*said second switch means comprising a third field effect transistor connected between said first electrode and said second voltage level and having a control electrode,*

*a delay capacitor connected between said control electrode and said second voltage level,*

*a delay field effect transistor having a control electrode connected to said first voltage level and a first electrode connected to the control electrode of said third field effect transistor and to said delay capacitor, and said delay field effect transistor further having a second electrode for receiving said input signal,*

*said delay field effect transistor being operable during a first phase of said input signal for rendering said third field effect transistor operable, said delay capacitor charging to the defference between said input signal and said second voltage level during said first phase,*

*said delay field effect transistor providing a discharge path for said delay capacitor during said second phase, said third field effect transistor being held in an operable condition for a period of time determined by the RC time constant of said delay field effect transistor and said delay capacitor, said period of time being sufficient to enable said first recited capacitor to charge to the difference voltage.*

References Cited

The following references, cited by the Examiner, are of record in the patented file of this patent or the original patent.

UNITED STATES PATENTS

| | | | |
|---|---|---|---|
| 3,070,762 | 12/1962 | Evans. | |
| 3,286,189 | 11/1966 | Michell et al. | 307—251 |

FOREIGN PATENTS

| | | |
|---|---|---|
| 28,884 | 12/1968 | Japan. |

STANLEY D. MILLER, Jr., Primary Examiner

B. P. DAVIS, Assistant Examiner

U.S. Cl. X.R.

307—279, 251